United States Patent [19]

Orcutt

[11] 4,422,719
[45] Dec. 27, 1983

[54] OPTICAL DISTRIBUTION SYSTEM INCLUDING LIGHT GUIDE

[75] Inventor: Donald E. Orcutt, Succasunna, N.J.

[73] Assignee: Space-Lyte International, Inc., Newark, N.J.

[21] Appl. No.: 261,688

[22] Filed: May 7, 1981

[51] Int. Cl.³ .............................................. G02B 5/14
[52] U.S. Cl. .................................. 350/96.30; 40/547; 350/96.10; 350/96.32; 362/32
[58] Field of Search ............... 350/96.10, 96.15, 96.24, 350/96.29, 96.30, 96.32, 96.34; 362/32; 40/427, 442, 444, 547; 264/1.5

[56] References Cited

U.S. PATENT DOCUMENTS

| | | | |
|---|---|---|---|
| 2,435,650 | 2/1948 | Greene | 362/32 |
| 3,472,921 | 10/1969 | Fyfe | 264/1.5 |
| 3,491,245 | 1/1970 | Hardesty | 350/96.10 X |
| 3,497,981 | 3/1970 | Tyne | 350/96.10 X |
| 3,535,018 | 10/1970 | Vasilatos | 350/96.24 |
| 3,549,878 | 12/1970 | Bailey | 362/32 |
| 3,641,332 | 2/1972 | Reick et al. | 350/96.10 X |
| 3,646,473 | 2/1972 | Young | 350/96.30 X |
| 3,829,675 | 8/1974 | Mariani | 350/96.10 X |
| 3,890,497 | 6/1975 | Rush | 362/32 X |
| 3,942,859 | 3/1976 | Korodi | 339/113 L |
| 4,095,101 | 6/1978 | Lemelson | 250/227 |
| 4,128,332 | 12/1978 | Rowe | 355/67 |
| 4,195,907 | 4/1980 | Zamja et al. | 350/96.32 |
| 4,234,907 | 11/1980 | Daniel | 362/32 |
| 4,323,951 | 4/1982 | Pasco | 362/32 X |

FOREIGN PATENT DOCUMENTS 137282 8/1979 German Democratic Rep. .............. 350/96.15
54-115097 9/1979 Japan ................................ 40/547
2028561 3/1980 United Kingdom ............ 350/96.24

OTHER PUBLICATIONS

S56940044-Plastic Optical Fibers, paper by Jack B. Wieler, E. I. du Pont de Nemours & Co., Inc. Wilmington, Delaware, Proceedings of the Society of Photo-Optical Instrumentation Engineers Seminar on Fiber Optics Come of Age, vol. 31, San Mateo, California. (Oct. 16, 17, 1972) pp. 3-12.

Primary Examiner—John D. Lee
Attorney, Agent, or Firm—Darby & Darby

[57] ABSTRACT

A flexible transmitting guide has a substantially transparent semi-solid core to which is shrink-fitted, or otherwise tightly clad, a transparent or translucent sleeve which is designed to laterally diffuse, disperse or refract a substantial component of light away from the core as it traverses the length of the guide. Thus, the clad core appears bright along its length and functions as a primary light source. In modifications of the device, the lateral dispersion of light passing along the core is enhanced by interposing cuts or discontinuities at intervals along its surface, or by providing a sleeve comprising an emulsion of light-reflecting particles. The light source may be adjacent to or separated from the core, and may comprise either a steady state, or pulsating source, ahead of which colored filters may be inserted, if desired. Numerous indoor and outdoor applications are contemplated for light guides in accordance with the present invention, including for signs, safety vests for traffic policemen, lighted canes for the disabled, lights for instrument panels, safety lights for vehicles and ships, and lights for interior and exterior decoration.

48 Claims, 16 Drawing Figures

OPTICAL DISTRIBUTION SYSTEM INCLUDING LIGHT GUIDE

BACKGROUND OF THE INVENTION

This relates in general to light transmission and distribution systems comprising light guides and more particularly, to such a system in which the transmitting light guide serves as a primary light source.

For some years, optical fibers have been utilized in the prior art for transmitting optical energy from a source to a preselected destination with minimal energy loss along the transmission path. Accordingly, as described in detail in an article entitled The Fiber Light Guide by Alan G. Chenoweth, Vol. 29, No. 5, May 1976 of *Physics Today,* page 28 et seq., and in U.S. Pat. No. 3,641,332, issued to Franklin G. Reick and Michael Ebert, Feb. 8, 1972, for Fiber Optics Illumination System, the principal object of such systems is to practically eliminate the lateral diffusion of the optical rays from the core during course of light transmission. This is accomplished by forming the optical transmission core of a material which has a substantially higher index of refraction than the surrounding sleeve. This is enhanced, as disclosed in U.S. Pat. No. 3,641,332, supra, by interposing an annular layer of air between the core and the surrounding sleeve. The light from a source at one end of the optical fiber, or bundle of fibers, is totally reflected from the periphery back toward the center of the core, so that almost no energy is lost through the sidewalls of the transmitting fiber, and almost the entire light energy from the source is delivered to the selected destination at the other end. Thus, the sidewalls of the transmitting fiber or bundle of fibers, appear dark, and unable to function as a primary light source.

Line or strip sources of light are provided in the prior art by elongated tubes filled with rare gases, such as neon or argon. These are inexpensive to fabricate and install and require high voltages to operate.

Further, prior art safety signs and the like are fabricated using reflecting strips, which act as secondary sources of light. But none of the foregoing is fully satisfactory for safety or other utilitarian purposes, or for decorative purposes.

SUMMARY OF THE INVENTION

Accordingly, it is the principal object of the invention to provide a primary light source comprising a light guide in the form of a flexible rod or strip, bright along its length, which is simple and inexpensive to manufacture and install.

In accordance with the present invention such a light guide comprises a single optical transmission core of clear resinous plastic or the like, having a transparent or translucent sleeve which is shrink-fitted or otherwise tightly fitted around the periphery so as to substantially remove the air interface, and wherein the sleeve is designed to laterally disperse, diffuse, or refract through its sidewall a substantial component of light transmitted along the core from a source at one end. This causes the sleeve to have a bright appearance and to serve as a primary source of light.

In accordance with one modification, the surface of the core is scored with angular cuts or discontinuities at intervals along the length for the purpose of deflecting the traversing light beams outwardly through the sleeve. The inside surface of the tube may be etched or otherwise treated chemically or mechanically to cause light striking it to diffuse. Another device for providing discontinuities for deflecting light through the sleeve wall is by introducing air bubbles into the core material while it is still molten. In accordance with another modification, light is deflected outwardly from the core by reflective particles in the form of powder embedded in the material of the sleeve. In another form, the sleeve may comprise a material having an index of refraction which exceeds that of the core.

The source of light, which may either by steadystate or pulsating, such as a strobe light, may preferably comprise a tiny light bulb interposed into the end of the sleeve, immediately adjacent the end of the core, although the source or bulb may be located beyond the end of the light guide. For variation, color filters, or a color wheel may be interposed between the light source and the input end of the light guide, imposing preselected colors on the light diffused through the walls of the sleeve.

One method of forming a combination in accordance with the present invention is by providing a tube of radially expanded plastic, such as tetrafluoroethylene, manufactured by E. I. DuPont de Neymours under the trademark TEFLON (TFE), having a 2 to 10 percent fill, with reflective or refractive powders such as, for example, titanium dioxide ($TiO_2$), or bismuth subcarbonate ($Bi_2O_3.CO_3)_2.H_2O$.

A thermosetting resin, which may, for example, comprise a liquid mixture of from 60–90% of allyl diglycol carbonate (CR39), with a 1.5 to 3.0 percent solution of isopropylpercarbonate (IPP), and the balance methyl methacrylate, is poured through a funnel into one end of the coil of tubing which is open at the other end, so that the liquid mixture flows down into the same by gravity. The coil is then transferred to a liquid bath, where the core is polymerized and substantially hardened by heating for a period of 12 to 24 hours at a temperature within the range 125 to 185 degrees Fahrenheit. The core material may be undercatalyzed in order for it to remain flexible. The tetrafluoroethylene sleeve may be shrink-fitted onto the polymerized core by heating the core and sleeve combination up to a temperature within the range, say, from 200 to 400 degrees Fahrenheit. In accordance with one embodiment the inner diameter of the enclosing sleeve is slightly less than the outer diameter of the core in order to impose a slight compression on the core and squeeze out any air remaining at the interface between the core and the sleeve.

Another alternative is to provide a sleeve consisting essentially of resins sold under the trademark AROCLOR (polychlorinated polyphenyls) which have indices of refraction ranging from 1.617 to 1.665, which is generally greater than that of the herein disclosed core materials which range around 1.5.

If shapes other than round are desired, such as elliptical, square, triangular, etc., the casing may be drawn through a die of the proper shape, in accordance with well-known extrusion practice.

The light guide of the present invention is adapted to be used for many applications. Because of its flexibility it can be used to form signs, both for utilitarian and decorative purposes, such as road safety signs, similar to the neon signs presently in use, and for line sources, both in and out of doors, for providing a soft, inexpensive light of any desired color over an extended area. The flexible rod light source of the present invention is also useful to light up strips on safety clothing, such as vests for traffic policemen, and for placement around the rims of vehicle wheels, or as the core of a rigid plastic rod, to be fastened to the rear of a bicycle, for safety purposes.

Other applications of the present invention, which are within the contemplation of this disclosure, are to surround meters on instrument panels and the like, and to surround mirrors and pictures, giving a uniform light around the edges.

The principal advantages of the light diffusing light guide of the present invention over prior art line sources are the simplicity and inexpensiveness of its manufacture, the ease with which it may be applied, and the many applications to which it is adapted.

These and other objects, features, and advantages will be better understood from a detailed study of the invention with reference to the attached drawings.

SHORT DESCRIPTION OF THE DRAWINGS

DETAILED DESCRIPTION OF THE INVENTION

Whereas, as explained hereinbefore, the principal object of the prior art was to provide a light guide which delivers optical energy, substantially without loss, to a selected destination, the object of the present invention is to provide various embodiments of light guides, each of which outwardly deflects or refracts a substantial component of the light being transmitted along its core.

Figure 1:
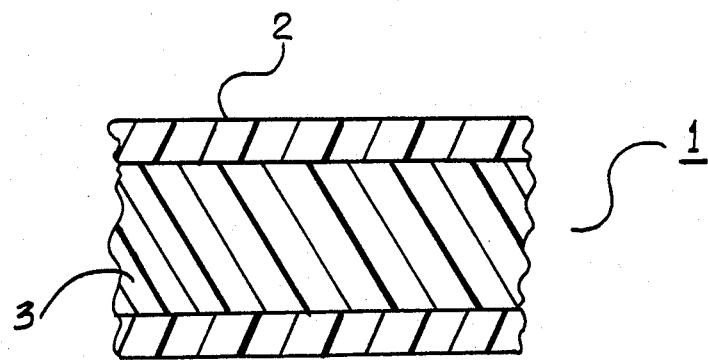
FIG. 1 is a longitudinal section of a light guide in accordance with the present invention showing the external sleeve shrunk tightly onto the inner light transmitting core so that air is substantially evacuated from the interface.

Referring to FIG. 1 of the drawings, there is shown in enlarged section, a flexible light guide 1 of the present invention in which a tube or sleeve 2 of a smooth, flexible transparent or translucent plastic material, is shrink-fitted onto a transparent, transmitting core 3, of transparent plastic or resinous material, so as to substantially eliminate any air interface between the core 3 and the sleeve 2. In at least one embodiment of the invention, the external sleeve has an index of refraction $N_2$ which exceeds the index of refraction $N_1$ of the core, so that total reflection does not take place. In other embodiments, the core or the sleeve are provided with discontinuities which outwardly diffuse or deflect a substantial component of the light traversing the core.

Figure 2:
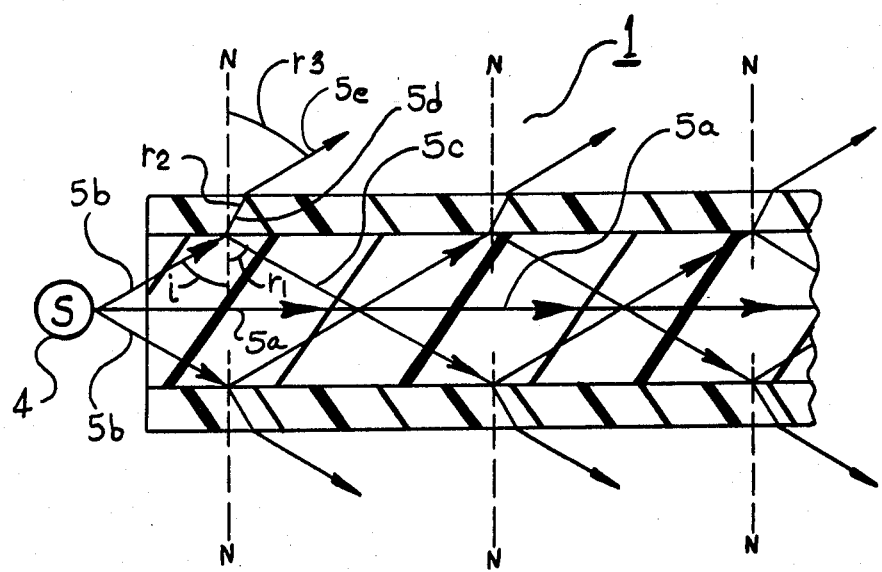
FIG. 2 is a schematic showing of a light beam from a light source passing down the core of a light guide shown in longitudinal section in accordance with the present invention, part being inwardly reflected, and part being refracted and/or reflected or diffused through the walls of the external sleeve.

When any conventional light source 4 is disposed adjacent to one end of light guide 1, as shown in FIGS. 1 and 2 of the drawings, a substantial amount of light energy impinges on the adjacent end, and is transmitted along the core of the guide in a manner depending on the angle of incidence of the beam. A beam, designated 5a, which enters the core parallel to its principal axis will travel in a substantially straight path along the core without being reflected or refracted. A beam 5b, which enters the core at an angle i, is partially reflected at an angle $r_1$, equal to the angle i, forming a beam 5c which passes in a zigzag path along the core 3. A component of beam 5b is also partly refracted through an angle $r_2$ at the inner periphery of the sleeve 2, forming a beam 5d which passes out through the sleeve, and which is again refracted through an angle $r_3$ at the outer periphery of the sleeve, to form an outwardly-directed beam 5e.

This tends to cause the sleeve 2 to appear bright, as a substantial proportion of the light from the source would be refracted outwardly, depending on the ratio of the indices of refraction and the angle of the incident light, as determined by the position of the source 4.

Figure 3:
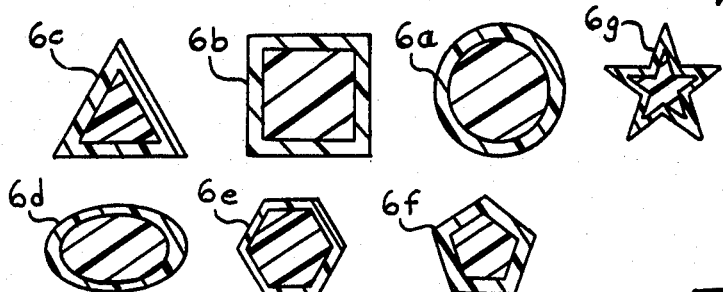
FIG. 3 shows, in cross-section, a series of typical shapes into which the light guide of the present invention can be extruded.

As shown in FIG. 3, it is contemplated that the cross-section of the light guide 1 need not be round, as shown in 6a, but can assume numerous different shapes such as square, triangular, elliptical, hexagonal, pentagonal, star-shaped, etc. as indicated in 6b–6g. This is achieved in accordance with well-known technology by passing the light guide casing through a die of the desired shape during processing. Pulsation or twisting may be applied during extrusion to achieve what is termed a "bellows" effect.

Figures 4A, 4B:
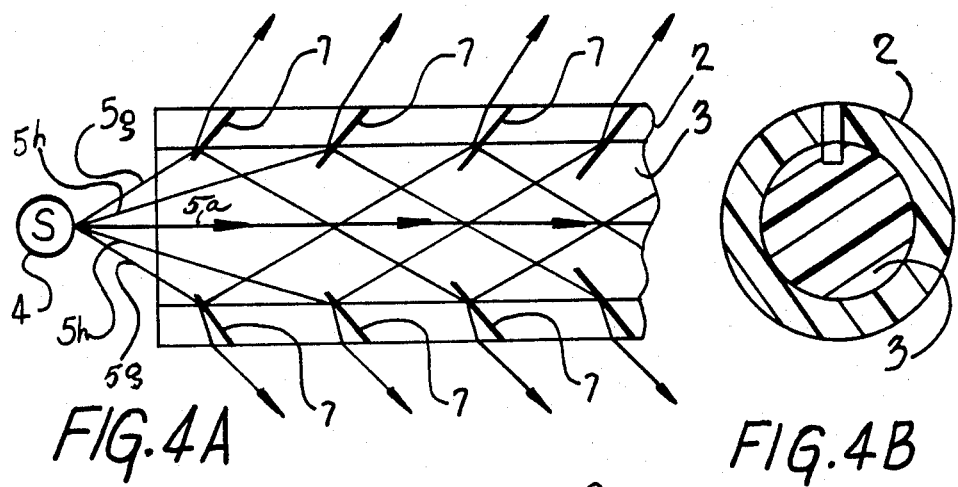
FIG. 4A and 4B are longitudinal and cross-sectional showings in accordance with the present invention in which a series of cuts or discontinuities have been interposed through the sleeve into the surface of the inner core, to cause the light rays to be deflected outwardly.

An alternative embodiment of the invention is shown in longitudinal and cross-section in FIGS. 4A and 4B of the invention in which a series of angular cuts 7 are interposed into the sleeve 2 of the light guide 1 along its length, and extended into the surface of the guide, forming discontinuities therein. Thus, beams 5g and 5h traversing the core 3 from the source 4, impinge on these discontinuities and are deflected outwardly through the sleeve 2, causing it to appear bright along its length. It is contemplated, for example, that the cuts taken at intervals along the core may be shaped, as shown in FIG. 4B. In order to provide substantially uniform brightness along the length of the light guide, the shaped cuts are made progressively larger as the longitudinal distance along the axis from the source increases, to reflect out a substantially larger percentage of the remaining light traversing the core at each cut.

Figure 5:
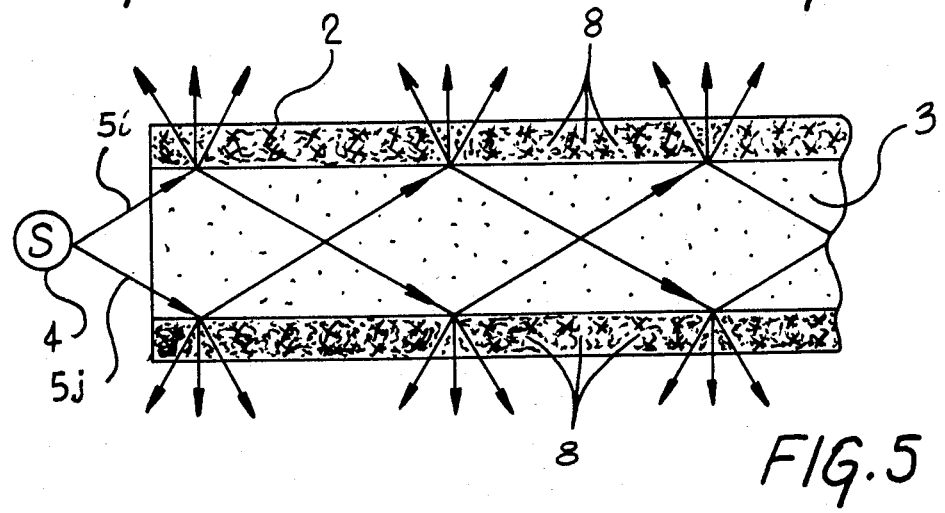
FIG. 5 is a longitudinal sectional showing in accordance with the present invention in which particles of powder have been mixed into the matrix material of the sleeve to cause light from the core to be reflected, refracted or diffused outwardly.

Another device for achieving the same result is shown in FIG. 5 of the drawings, wherein the sleeve 2 comprises a matrix of plastic material which, during preparation, has been mixed with powdered reflecting material, such as certain types of metal oxides, to render it translucent. Beams 5i and 5j, for example, traversing the core 3 tend to strike the powder granules and are thereby deflected to pass out through the sleeve, thus causing the sleeve to appear bright.

Other devices for achieving this result are by etching or otherwise engraving a spiral strip on the surface of the core 3, prior to enclosing the same in the outer sleeve.

Another device is to "bleed in" bubbles or foreign materials through a needle into the inner core while the same is still in a viscous state, or by vigorously shaking up the core material before pouring it into the sleeve during processing.

Figures 6, 7:
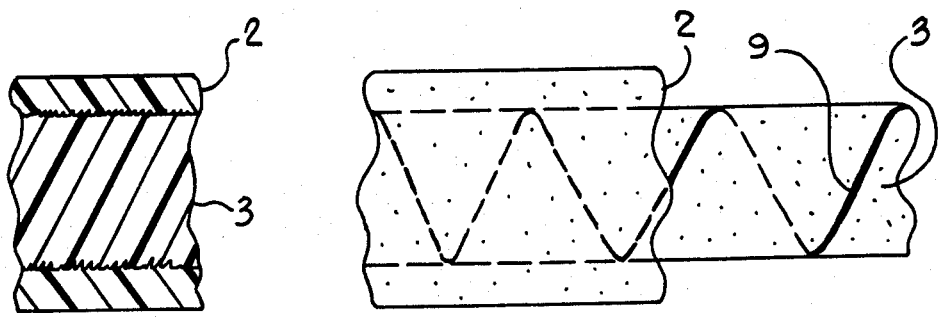
FIG. 6 is a side elevation of a modification in accordance with the present invention in which a spiral marking has been etched or otherwise engraved onto the surface of the core to cause light to be deflected outwardly.
FIG. 7 is a longitudinal sectional showing of a further modification of the light guide of the present invention in which the inside of the sleeve has been either chemically or mechanically roughened to cause light from the core to be diffused or deflected outwardly.

Another technique in accordance with the present invention, illustrated by the longitudinal sectional showing of FIG. 7, comprises etching or taking other mechanical or chemical steps, such as treating with sodium naphthalene, to roughen the inner surface of the sleeve 2 before the core material is added.

The following is a typical numerical example for preparing a light guide in accordance with the present invention.

EXAMPLE

A tubular coil 12 of sleeve material, say 10 feet long, 3/16 inch outer diameter and ¼ inch inner diameter, has a matrix consisting essentially of tetrafluoroethylene TFE, is filled with from 2 to 10 percent of reflecting metal oxide powder, having a average grain size of talcum powder, or the like.

The radially-expanded tubular coil 12 is filled with a viscous liquid core material, which, in the present example comprises the following formulation:

|  | Range | Preferred |
| --- | --- | --- |
| allyl diglycol carbonate (CR39) | 60–90% | 88% |
| isopropylpercarbonate (IPP) | 1–3 sol. | 2% sol. |
| methyl methacrylate | Balance | 10% |

Figures 8, 9A:
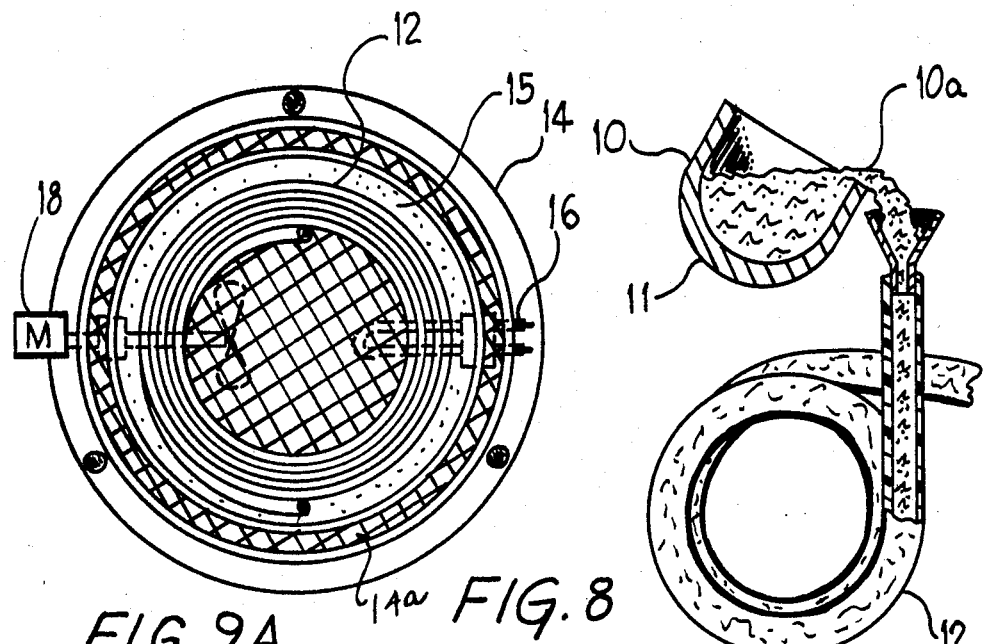
FIG. 8 shows the process in accordance with the present invention of pouring a liquid mixture of core material into the sleeve.
FIG. 9A and 9B show the process of heat treating a coil of filled tubing in a heated bath for polymerizing the core of the light guide of the present invention.
Figure 9B:
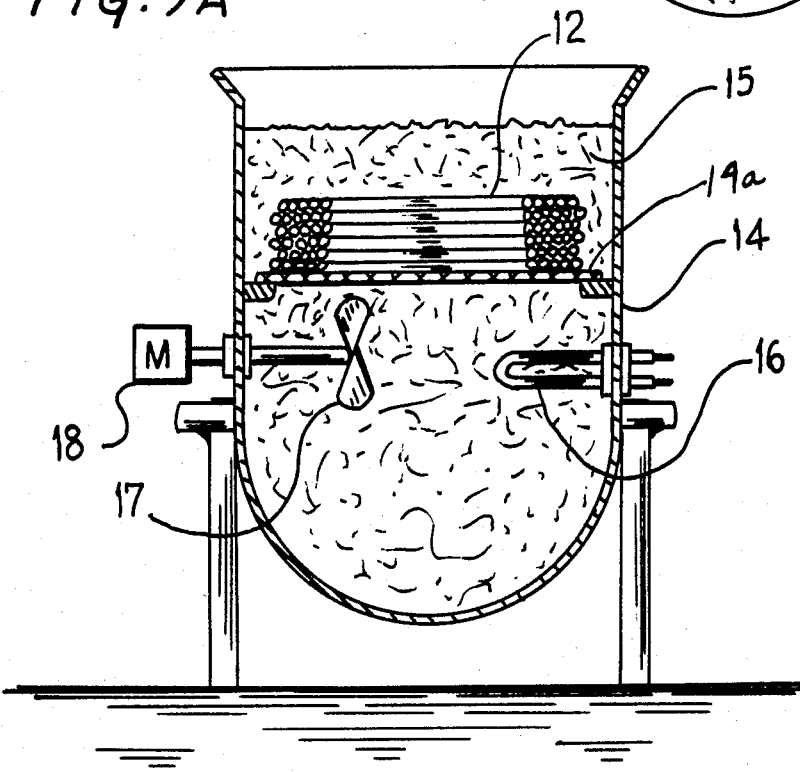

The liquid mixture 10 is then poured through a funnel into one end of the coiled tetrafluoroethylene sleeve 12, which is open at the other end. (See FIG. 8).

The coil 12 containing the liquid core material 3 is then mounted on a screen support 14a for a period of from 12–24 hours in conventional container 14 of a liquid bath 15, which is maintained at a temperature of 120 to 170 degrees Fahrenheit by a conventional heater 16, and which is constantly stirred by an impeller 17 driven by motor 18. This enables the core material to polymerize, forming a flexible thermoset transparent inner core.

In accordance with an alternative embodiment, the tubular coil 12 can be formed of a material having an index of refraction exceeding that of the core material. A suitable material for this purpose is a polychlorinated polyphenyl resin known by the trademark AROCLOR which has an index of refraction of about 1.6. Referring again to FIG. 2, when a sleeve of such a material is used, it is unnecessary to use filler materials or discontinuities in the sleeve 2 or the core 3 as a beam from the source 4 impinging on the inner wall of the sleeve 2 will be outwardly refracted through the sleeve.

APPLICATIONS OF THE PRESENT INVENTION

Numerous applications are contemplated for use of the light guide of the present invention.

Figure 10:
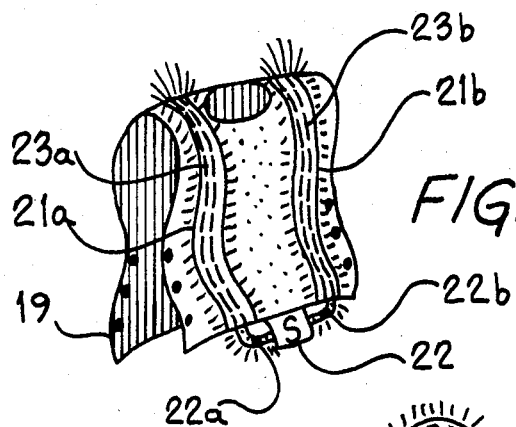
FIG. 10 is an application of the light guide tubes of the present invention to a safety vest for traffice directors, miners, and other applications.

Referring to FIG. 10, there is shown a vest 19 which is particularly applicable to night-time operations, for use by traffic policemen and other directors of traffic, miners, and various types of sports persons, such as, for example, joggers and skiers. This may be formed of any of the materials used for such garments, cut to a conventional pattern adapted to slip over the head of the user, providing a highly visible front and back panel. A pair of vertical strips 21a and 21b, each about three inches wide are sewn or otherwise secured along their long edges, parallel to the lateral edges of the vest, in such a manner that in each case an inside vertically extending channel is provided between the strips and the backing material of the vest. Elongated light guides 23a and 23b, formed in accordance with any one of FIGS. 1–7 of the present invention, are respectively accommodated in the channels provided by each of strips 21a and 21b. The input ends of 23a and 23b are each connected to light source 22. This may comprise a pair of small ½ watt bulbs 22a and 22b secured in the respective ends of light guides 23a and 23b which are energized by means of a conventional battery. It is contemplated that for most applications light guides 23a and 23b are extended over the shoulders and down the rear of the vests. It is also within the contemplation of the present invention that a conventional pulsing device may be incorporated into the source 22 which causes the light bulbs 22a and 22b to flash on and off. The source 22 may be fitted into a small pocket provided for that purpose at the lower end of the vest 19.

Another application of the light guides of the present invention is for incorporation into various types of signs and indoor and outdoor line sources for both utilitarian and decorative illumination in the manner of neon, argon, and other gas-filled tubes used in the prior art for such purposes.

Figure 11:
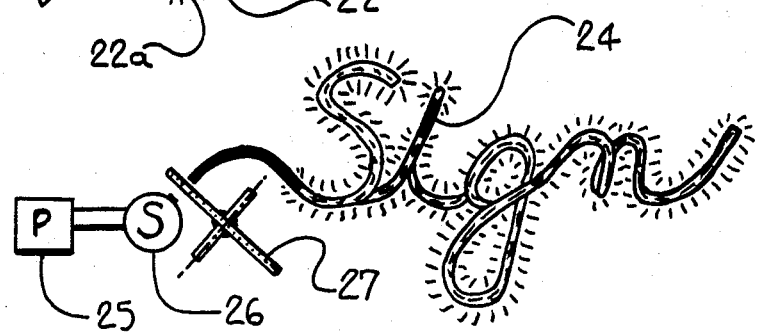
FIG. 11 shows a sign formed from a light guide in accordance with the present invention in combination with a pulsing device.

One illustration of such use is shown in FIG. 11 of the drawings, in which the light guide of the present invention is sufficiently flexible to form such letters as may be desired. In accordance with the alternative previously indicated, a conventional power source may incorporate pulsing means 25 connected to turn on and off the light source 26. In this embodiment, the light source may, for example, comprise a 1 to 1000 watt bulb, energized either by a battery or conventional source of power, which may either be fitted into the input end of the light guide forming the letters SIGN, or may be slightly spaced-apart therefrom. In the latter case, it may be desired to interpose a motor-driven color wheel 27 which would function to periodically change the color of the sign. For this application, it is contemplated that any of the light guides of the types disclosed in FIGS. 1-7 can be used.

Figure 12:
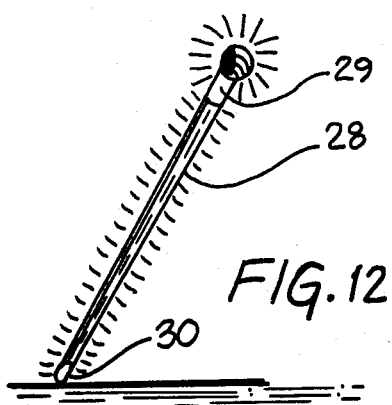
FIG. 12 shows a cane for the disabled, employing the light guide of the present invention.
Figure 13:
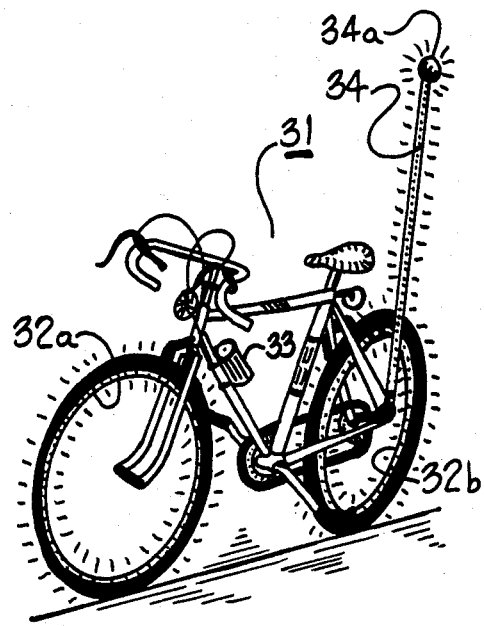
FIG. 13 shows a bicycle having light guides in accordance with the present invention surrounding the inner periphery of the wheel rims; and a light guide in accordance with the present invention incorporated into a safety light rod attached to the rear of the bicycle.
Figure 14:
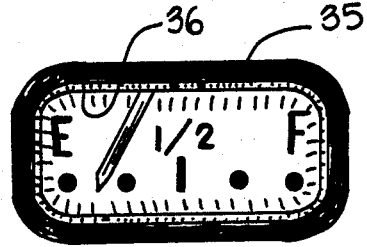
FIG. 14 shows application of the light guide of the present invention to a meter dial in an instrument panel.

Other applications of the light guides disclosed in any one of FIGS. 1-7 are shown in FIGS. 12, 13 and 14. FIG. 12 shows a cane 28 for the disabled in which, for example, battery operated light source is built into the upper end. Although a substantial portion of the light traversing the length of the cane is dissipated laterally, it is contemplated that a portion of the light will travel to the lower end 30, providing a lighted lower tip, for guidance purposes; and a portion of light would also be available at the upper end.

One of the most important applications of the invention is for safety lights for vehicles, which is illustrated by the bicycle of FIG. 13. A flexible light guide in accordance with the present invention is disposed around the inner periphery of the wheels. An additional light guide is interposed into a rigid tube of materials sold under the trademark LEXAN (polycarbonate), or similar material, vertically fastened to the rear of the vehicle. It is contemplated that all of these light guides will be lighted by small ½-10 watt bulbs, incorporated into the light guide sleeves, in each case.

They will be energized from a battery source 33 fastened to the frame or by an on-board generator. As an additional feature, the LEXAN tube including light guide 34 may terminate at its upper end in a lighted ball 34a, which may comprise a ball of transparent or translucent material similar to the core material.

It will be understood that similar safety lights in accordance with the present invention can be utilized for many different types of vehicles, such as automobiles, trains, ships, boats, aircraft, etc.

Another application of the invention is illustrated in FIG. 14, which shows the dial of a meter 35 with a light guide 36 in accordance with the present invention disposed around its inner periphery. It is contemplated that this can be energized by batteries, or another conventional source, at the rear of the dial or elsewhere, which energized one or more small light bulbs of, say, 1/10 to 1 watt, incorporated into the sleeve of the light guide.

Although a number of examples have been given of applications of the light guide of the present invention, it will be understood that the invention is not limited to the specific applications or forms set forth herein by way of example, but only by the scope of the appended claims.

What is claimed is:

1. An optical distribution system comprising in combination:
   a source of light;
   means to apply light derived from said source to an area requiring illumination;
   said means comprising a flexible light guide coupled in light-transmitting relation to said source, said light guide comprising a flexible core of light transmitting material; and
   a sleeve of transparent or translucent material tightly surrounding said core in unbonded relationship thereto and in a manner to substantially eliminate air from the interface between said core and said sleeve, said sleeve and said core being constructed and arranged to laterally diffuse, disperse or refract through the sidewall of said sleeve a substantial component of the light traversing said core longitudinally.

2. The combination in accordance with claim 1 wherein the material of said sleeve has an index of refraction which exceeds the index of refraction of the material of said core.

3. The combination in accordance with claim 1 wherein the material of said sleeve comprises a matrix in which is embedded a substantial quantity of light reflecting powder.

4. The combination in accordance with claim 1 wherein said core contains a plurality of discontinuities spaced-apart along its length constructed to deflect a substantial component of light passing along said core and out through said sleeve.

5. The combination in accordance with claim 4 wherein said discontinuities comprise a series of cuts along the length of said light guide disposed in said sleeve and extending into the periphery of said core, said cuts being disposed at angles to outwardly deflect through said sleeve a substantial component of light traversing said core from said source.

6. The combination in accordance with claim 5 wherein each of said cuts is constructed and arranged so that the percentage of light traversing said core which is reflected outwardly by said cut varies substantially as a direct function of the distance of said cut along said core from said source.

7. The combination in accordance with claim 4 wherein said discontinuities comprise a series of air bubbles formed in the body of said core along its length.

8. The combination in accordance with claim 1 wherein the inner surface of said sleeve in contact with said core is roughened by chemical or mechanical treatment to diffuse and/or outwardly deflect a substantial component of light traversing said core which strikes said inner surface.

9. The combination in accordance with claim 1 wherein the inner diameter of said sleeve is slightly less than the initial outer diameter of said core, thereby to impose a slight compression on said core.

10. The combination in accordance with claim 1 wherein said flexible light guide is shaped to form the letters or figures of an electric sign.

11. The combination in accordance with claim 1 wherein said flexible light guide is shaped to form a lighted cane for the disabled, one component of the light from said source being reflected or refracted laterally along the length.

12. The combination in accordance with claim 1 wherein said light guide is disposed around the rims of vehicle wheels to provide a safety light.

13. The combination in accordance with claim 1 wherein said light guide is encased in a rigid transparent or translucent tube disposed vertically at the rear of a vehicle to provide a safety light.

14. The combination in accordance with claim 1 wherein said light guide is disposed on an inner or outer surface as a line source to provide decorative lighting.

15. The combination in accordance with claim 1 wherein said light guide is disposed around the peripheries of a dial in an instrument panel.

16. The combination in accordance with claim 1 wherein said light guide is disposed on the inner periphery of a picture frame or mirror for improved viewing.

17. The combination in accordance with claim 1 wherein said light guide is fastened longitudinally on a safety vest for providing visibility for the wearer, and wherein said source is disposed in a pocket in said vest.

18. The combination in accordance with claim 1 wherein said source includes pulsing means which periodically turns the light traversing said light guide on and off.

19. The combination in accordance with claim 1 wherein a color wheel is interposed between said source and said light guide for periodically changing the color of light passing from said source through said light guide and reflected and/or refracted out through the wall of said sleeve.

20. The combination in accordance with claim 1 wherein said light guide comprises a single core consisting essentially of a mixture of 60 to 90 percent allyl diglycol carbonate (CR39), a solution of between 1.5 and 3.0 percent of isopropylpercarbonate, and the balance methyl methacrylate.

21. The combination in accordance with claim 20 in which the sleeve material consists essentially of tetrafluoroethylene TFE having a 2 to 10 percent fill of metal oxide reflective or refractive powder.

22. The combination in accordance with claim 21 wherein said metal oxide reflective or refractive powder is selected from the group consisting essentially of either bismuth subcarbonate, titanium dioxide or mixtures thereof.

23. The combination in accordance with claim 20 wherein the material of said sleeve has an index of refraction which exceeds that of said core.

24. The combination in accordance with claim 23 in which said sleeve material comprises a substantial proportion of polychlorinated polyphenyl resin.

25. The method of forming a light guide which is constructed to function as a primary light source which comprises the steps of:
radially expanding a length of translucent or transparent flexible plastic tubing to the desired dimensions;
filling said tubing with resinous plastic material which is adapted to form a flexible substantially transparent core; and
polymerizing and hardening said core by baking said light guide in a hot liquid bath for 12 to 24 hours at a temperature of 125 to 185 degrees Fahrenheit, whereby said flexible plastic tubing is shrink-fitted onto said core substantially squeezing the air out of the interface between said core and said tube.

26. The method in accordance with claim 25 which includes the step of interposing onto said core said flexible plastic tubing having an inner diameter which is slightly less than the initial outer diameter of said core, thereby to impose a light compression on said core.

27. The method in accordance with claim 25 wherein said flexible plastic tubing consists essentially of tetrafluoroethylene TFE into the matrix of which has been mixed a filler of 2 to 10 percent of metal oxide powder.

28. The method in accordance with claim 25 wherein a series of cuts are interposed along the length of said tubing and extending into the periphery of said core, said cuts being angled to outwardly deflect through the wall of said tube a component of light traversing said core.

29. The method in accordance with claim 28 wherein each of said cuts is constructed and arranged to reflect out through said flexible plastic tubing a percentage of the remaining light passing along said core which is substantially a direct function of the distance of said cut from said source.

30. The method in accordance with claim 25 wherein the interior surface of said flexible tubing is roughened by etching or otherwise chemically or mechanically treating said surface prior to filling said tubing with said core material.

31. The method in accordance with claim 25 wherein discontinuities are etched or otherwise engraved into the surface of said core.

32. The method in accordance with claim 31 wherein said discontinuities take the form of a continuous spiral marking on the surface of said core.

33. The method in accordance with claim 25 wherein bubbles are bled through a needle interposed into said molten core material in said tubing prior to hardening of the same.

34. The method in accordance with claim 25 wherein said tubular material shrinks up to 75 percent during processing, thereby compressing said core and squeezing out the air between the interface between said tube and said core.

35. The method in accordance with claim 25 wherein the said light guide is shaped by extruding it through a die.

36. A light dispensing guide comprising in combination:
a flexible core of light transmitting material;
a sleeve of transparent or translucent material tightly surrounding said core in unbonded relationship thereto in a manner to substantially eliminate air from the interface between said core and said sleeve, said sleeve and said core being constructed and arranged to laterally diffuse, disperse or refract through the sidewall of said sleeve a substantial component of the light traversing said core longitudinally.

37. The combination in accordance with claim 36 wherein the material of said sleeve has an index of refraction which exceeds the index of refraction of the material of said core.

38. The combination in accordance with claim 36 wherein the material of said sleeve comprises a matrix in which is embedded a substantial quantity of light reflecting powder.

39. The combination in accordance with claim 36 wherein said core contains a plurality of discontinuities spaced-apart along its length constructed to deflect a substantial component of light passing along said core and out through said sleeve.

40. The combination in accordance with claim 39 wherein said discontinuities comprise a series of cuts along the length of said light guide disposed in said sleeve and extending into the periphery of said core, said cuts being disposed at angles to outwardly deflect through said sleeve a substantial component of light traversing said core longitudinally.

41. The combination in accordance with claim 40 wherein said cuts in said core are constructed to provide reflecting surfaces directed to form acute negative angles preferably about 45° with the normal to the principal axis of said core in the longitudinal plane of said core.

42. The combination in accordance with claim 40 wherein each of said cuts is constructed and arranged so that the percentage of light traversing said core reflected outwardly by said cuts varies substantially as a direct function of the distance of said cut along said core from a light incident end thereof.

43. The combination in accordance with claim 39 wherein said discontinuities comprise a series of air bubbles formed in the body of said core along its length.

44. The combination in accordance with claim 36 wherein the inner surface of said sleeve in contact with said core is roughened by chemical or mechanical treatment to diffuse and/or outwardly deflect a substantial component of light traversing said core which strikes said inner surface.

45. The combination in accordance with claim 36 wherein the inner diameter of said sleeve is slightly less than the initial outer diameter of said core, thereby to impose a light compression on said core.

46. The combination in accordance with claim 36 wherein said light guide comprises a single core consisting essentially of a mixture of 60 to 90 percent allyl diglycol carbonate (CR39), a solution of between 1.5 and 3.0 percent isopropylpercarbonate (IPP) and the balance methyl methacrylate.

47. The combination in accordance with claim 46 wherein said sleeve material consists essentially of tetrafluoroethylene TFE having a 2 to 10 percent fill of metal oxide reflective or refractive powder.

48. The combination in accordance with claim 46 in which said sleeve material comprises a substantial proportion of polychlorinated polyphenyl resin.

* * * * *